United States Patent [19]

Jiro

[11] Patent Number: 5,150,731
[45] Date of Patent: Sep. 29, 1992

[54] BUTTERFLY VALVE TO PREVENT DEW CONDENSATION THEREFROM

[75] Inventor: Kamezawa Jiro, Daito, Japan

[73] Assignee: Tomoe Technical Research Co., Japan

[21] Appl. No.: 634,398

[22] Filed: Dec. 27, 1990

[30] Foreign Application Priority Data

Jul. 20, 1990 [JP] Japan .............. 2-192663[U]

[51] Int. Cl.⁵ .............................. F16L 7/00
[52] U.S. Cl. ................................. 137/375
[58] Field of Search .......... 137/375; 251/305

[56] References Cited

U.S. PATENT DOCUMENTS

| | | |
|---|---|---|
| 1,606,500 | 11/1926 | Bodman . |
| 3,990,675 | 11/1976 | Bonafous ............. 251/148 |
| 4,510,965 | 4/1985 | Peroux et al. ........ 251/305 |
| 4,774,750 | 10/1988 | Platusich ............. 29/157 |
| 4,777,977 | 10/1988 | Platusich ............. 137/375 |

FOREIGN PATENT DOCUMENTS

| | | |
|---|---|---|
| 6607510 | 3/1967 | Denmark . |
| 2338591 | 2/1975 | Denmark . |
| 1139182 | 1/1969 | United Kingdom . |
| 2011586 | 7/1979 | United Kingdom ....... 137/375 |

*Primary Examiner*—A. Michael Chambers

[57] ABSTRACT

A butterfly valve having a thermal break point located in the shaft cylinder portion through which the valve stem passes is shown and described. The thermal break is a heat insulating material which may be non-metallic, a plastic, and an electrical insulator. The portion of the shaft cylinder extending out of an insulating core is made of insulating material and connected to metallic parts of the valve shell structure by gluing, vibration melting adhesion, and mechanical overlapping methods.

20 Claims, 15 Drawing Sheets

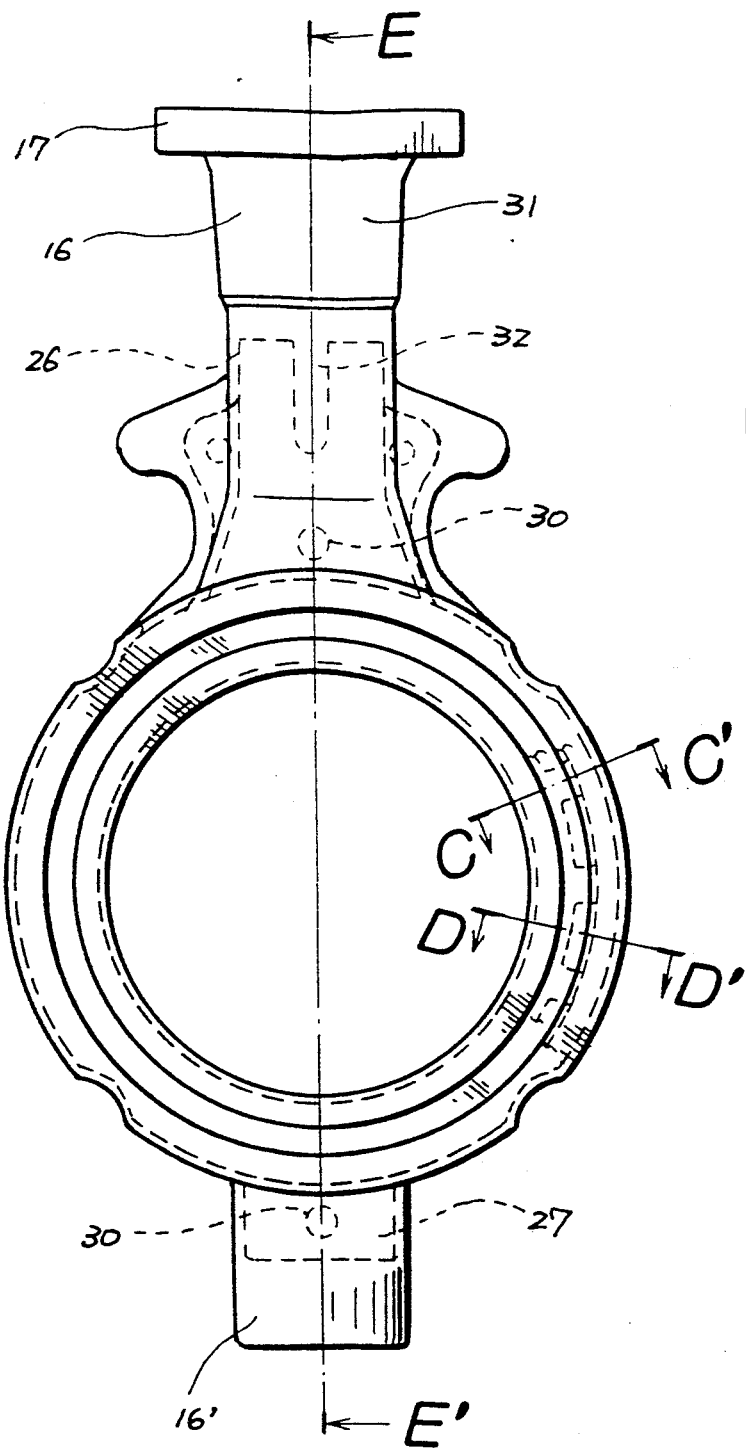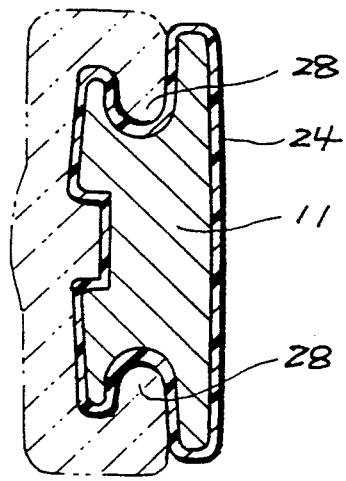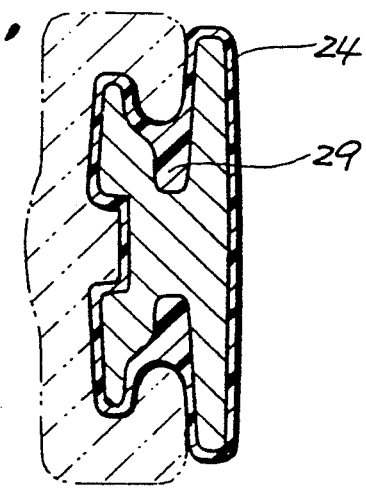

FIG.21
FIG.22
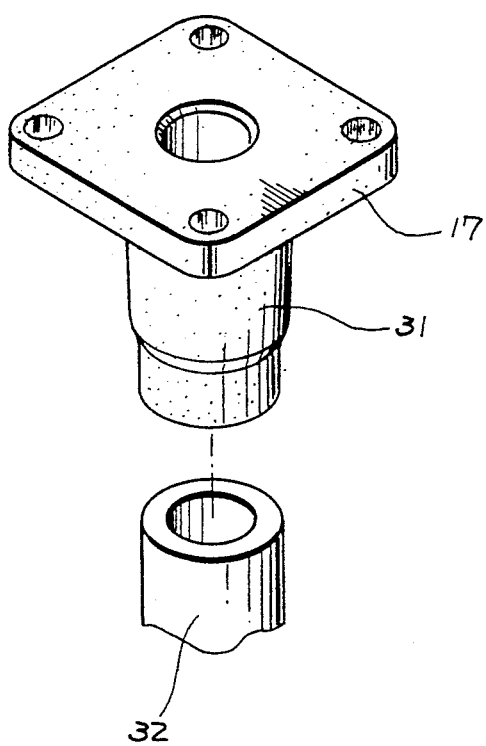
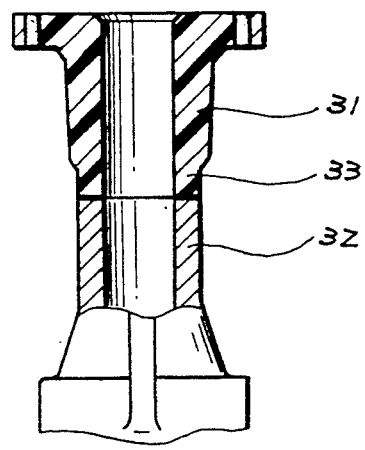

BUTTERFLY VALVE TO PREVENT DEW CONDENSATION THEREFROM

BACKGROUND OF THE INVENTION

1. Field of the Invention

This invention relates to a butterfly valve to prevent dew condensation therefrom, and more particularly relates to a butterfly valve which prevents dew condensation from producing on its external surface resulting from the temperature difference between the atmosphere and fluid which flows in a pipe.

2. The Related Art

In the prior art pipes in which low temperature fluid flows, such as air conditioning, steps are taken to cover the external surface with an insulating material for preventing dew condensation. Without insulation, dew condensation from the moisture in the atmosphere is produced on the external surface of butterfly valves and pipes by the temperature difference between flowing fluid and atmosphere.

An insulating material can cover a part of a shaft cylinder including a valve body. However, it is difficult to cover all of a shaft cylinder which extends at right angles to a pipe line and an actuator, etc., connected to the shaft cylinder, because those shapes are very complicated and have a different direction from the piping line.

In the prior art, such parts are exposed to the atmosphere and it is a problem that dew condensation from the moisture of the atmosphere occurs on the external surface of a shaft cylinder and actuator which are exposed to the atmosphere. Also, corrosion occurs by water drops from dew condensation and the floor becomes dirty by water dropping from the valve.

Therefore, attempts have been made to cover said shaft cylinder and actuator. However, it is difficult to apply many kinds of insulating material to one butterfly valve because a separate insulating cover which is different from one covering a piping line is necessary, because of the location of shaft cylinder and actuator is at right angles to a piping line, and because an actuator has a very complicated external surface shape. Actuators also have different shapes and structure in accordance with the function, use, place for use and controlling system, etc.

For example, in the typical prior art, as shown in FIG. 26, the butterfly valve (1) is attached between pipes (2)(2) and/or flanges (3)(3).

Even though the valve body of butterfly valve (1) and pipes (2)(2) are covered by insulating material, a shaft cylinder which extends to the direction at the right angles to pipes (2)(2) and actuator (7) cannot be covered by the same insulating cover (5) as covered by the external surface of said valve body. Therefore, a separate insulating cover is prepared and covers a shaft cylinder (6) and actuator (7).

This separated insulating cover must be prepared for each valve in accordance with the shape and structure of actuator. The use of this separate insulating cover requires locating an open indicator (9) at the outside of the cover (8) because the indicator must be read.

SUMMARY OF THE INVENTION

In this invention, the structure of butterfly valves in which all external surfaces of the valve body, including the shaft cylinder which extends at the right angles to the piping line, is covered by one insulating resin material.

Even when all external surfaces of a valve are covered by an insulating resin material, dew condensation is produced on the outside part of the shaft cylinder which is exposed to the atmosphere while it extends out of the insulating cover.

This situation comes from communicating the low temperature of the fluid through a part of the shaft which extends through the insulating covering material.

An object of the present invention is to provide a butterfly valve which prevents dew condensation from occurring on the outside surface of the external parts of the shaft cylinder and an actuator which are exposed to the atmosphere. This invention prevents the low temperature of the controlled fluid from conducting parts by setting a thermal conducting breaking part formed only by insulating resin material between the outside part of a shaft cylinder which is exposed to the atmosphere without an insulating cover and the inside part of a shaft cylinder which is covered by an insulating cover.

This invention is for use with a valve body having a cylindrical flow passage therein, a disk valve located rotatably in said valve body and a seated ring. The valve has a sealing material which is inserted between the inner round (circumference) surface of said valve body and the outer round surface of a pair of valve stems and is contacted to said outer round surface of said valve. The valve has one valve stem having a driving side and an idling side which extends outside from the opposite side of a diameter direction of said valve, and a pair of shaft cylinders for a driving side and an idling side which extends outside from the opposite side of diameter direction of said valve body. In this invention, a thermal conducting breaking part is set on a part of said shaft cylinder of the driving side, and said thermal conducting breaking part is located on the outside surface of an insulating cover. The insulating cover is applied on the external round surface of said valve body for preventing dew condensation, and is also formed around said shaft cylinder.

Also, the means adapted in this invention is comprised of a shell structure part which is made of a metal material and an insulating covering part which covers all surfaces of said shell structure part; said shell structure part having the almost cylindrical valve body forming flow passage, the shaft cylinder part which extends outside from the opposite side of diameter direction of said valve body and a setting plate part set on the outer edge of the shaft cylinder; said shell structure part being formed on the smaller size than the prescribed size of the butterfly valve by the thickness of insulating covering part; said insulating covering part being made of synthetic resin material having insulating property, connecting closely to all surfaces of said shell structure part as one body; the shaft cylinder of driving side being applied around the surface of the valve body; said shell structure part ending at the critical covering part of insulating cover which covers the shaft cylinder of a driving side; the outside part of the shaft cylinder of a driving side being formed by insulating synthetic resin material of insulating cover; and a thermal conducting breaking part made of only insulating synthetic resin material being formed between the outside part of the shaft cylinder of a driving side and said end of a shell structure part.

BRIEF DESCRIPTION OF THE DRAWINGS

FIG. 9 is a front view of a whole of a butterfly valve of the invention.

FIG. 10 is a sectional view of FIG. 9 along the line C—C'.

FIG. 11 is a sectional view of FIG. 9 along the line D—D'.

FIGS. 19-24 are another modified embodiment of the present invention.

FIG. 19 is an exploded perspective view of another modified embodiment.

FIG. 20 is a sectional view of a further modified embodiment shown in FIG. 19.

FIG. 21 is an exploded perspective view of a further modified embodiment.

FIG. 22 is a sectional view of a further modified embodiment shown in FIG. 21.

FIG. 23 is an exploded perspective view of still a further modified embodiment.

FIG. 24 is a sectional view of still a further modified embodiment.

DETAILED EXPLANATION OF THE PREFERRED EMBODIMENT

Figure 1:
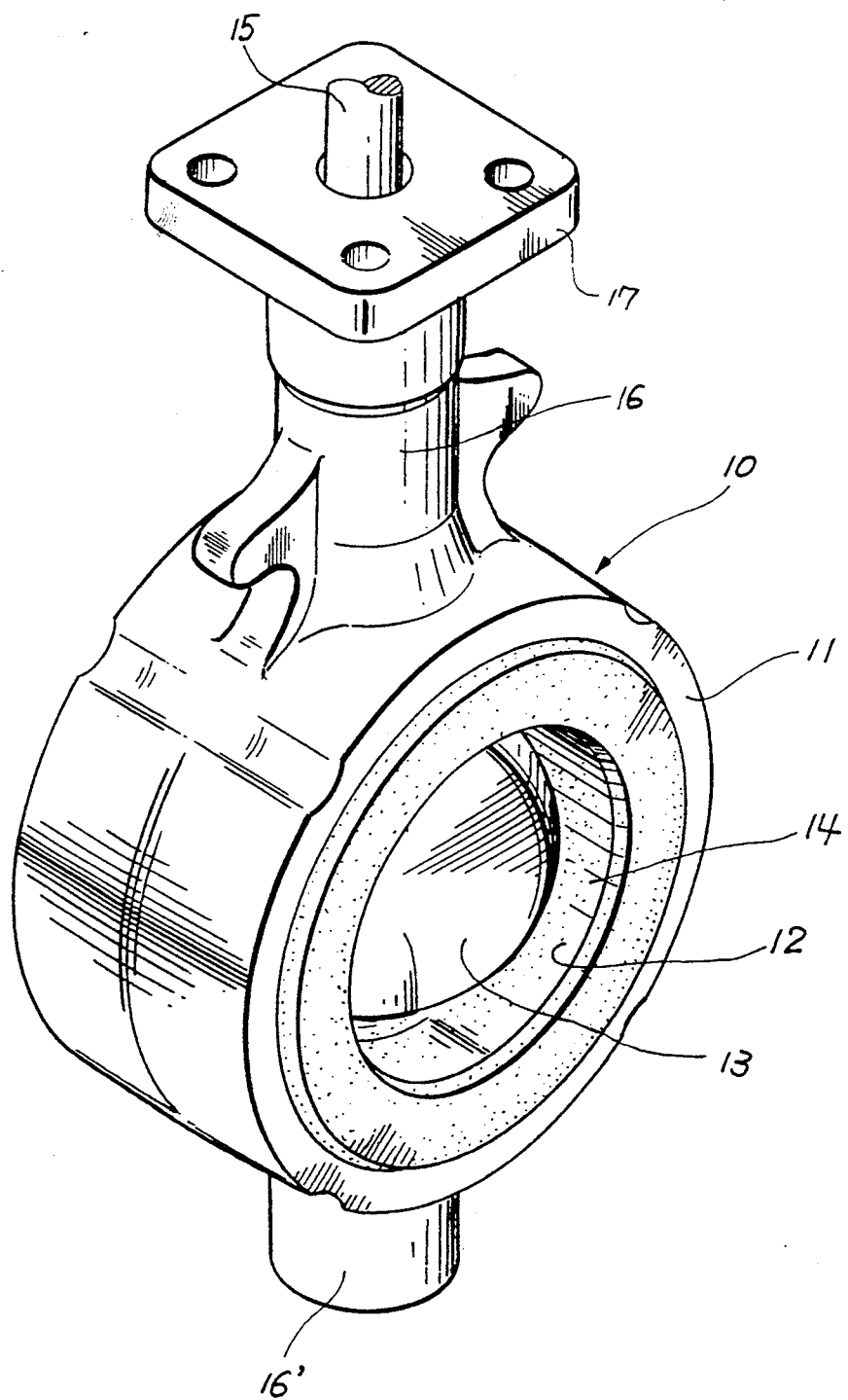
FIG. 1 is an outside appearance perspective view of a butterfly valve.

The butterfly valve shown in FIG. 1 has substantially the same structure as a conventionally well-known one.

In FIG. 1, a valve body (11) is formed as having a fluid passage (12) running axially therein, and a disk valve (13) is sustained rotatably on a shaft in the inside of the valve body (11).

A seated ring (14)(15) is made of elastic rubber or metal material, etc., and is inserted between the inner surface of a fluid passage (12) and the valve (13).

The opening or closing of the fluid passage and the amount of flowing fluid can be controlled by contacting or parting the outer surface of the rotatable valve (13) onto or from the inner surface of the seated ring (14).

The valve stem (15) sustains said valve (13) on its shaft. The valve stem is set on the opposite sides of the valve (13).

The valve stem (15) extends through a shaft cylinder (16)(16') of a driving side and a idiling side, which extends outside on a radial direction from the outer surface of the valve body (11). An actuator (which is not shown in FIG. 1), drives said valve stem (15), and is connected to the outer edge of a driving stem of driving side.

The actuator is set on a setting plate (17) located on the outer edge of the shaft cylinder of a driving side (16).

Figure 2:
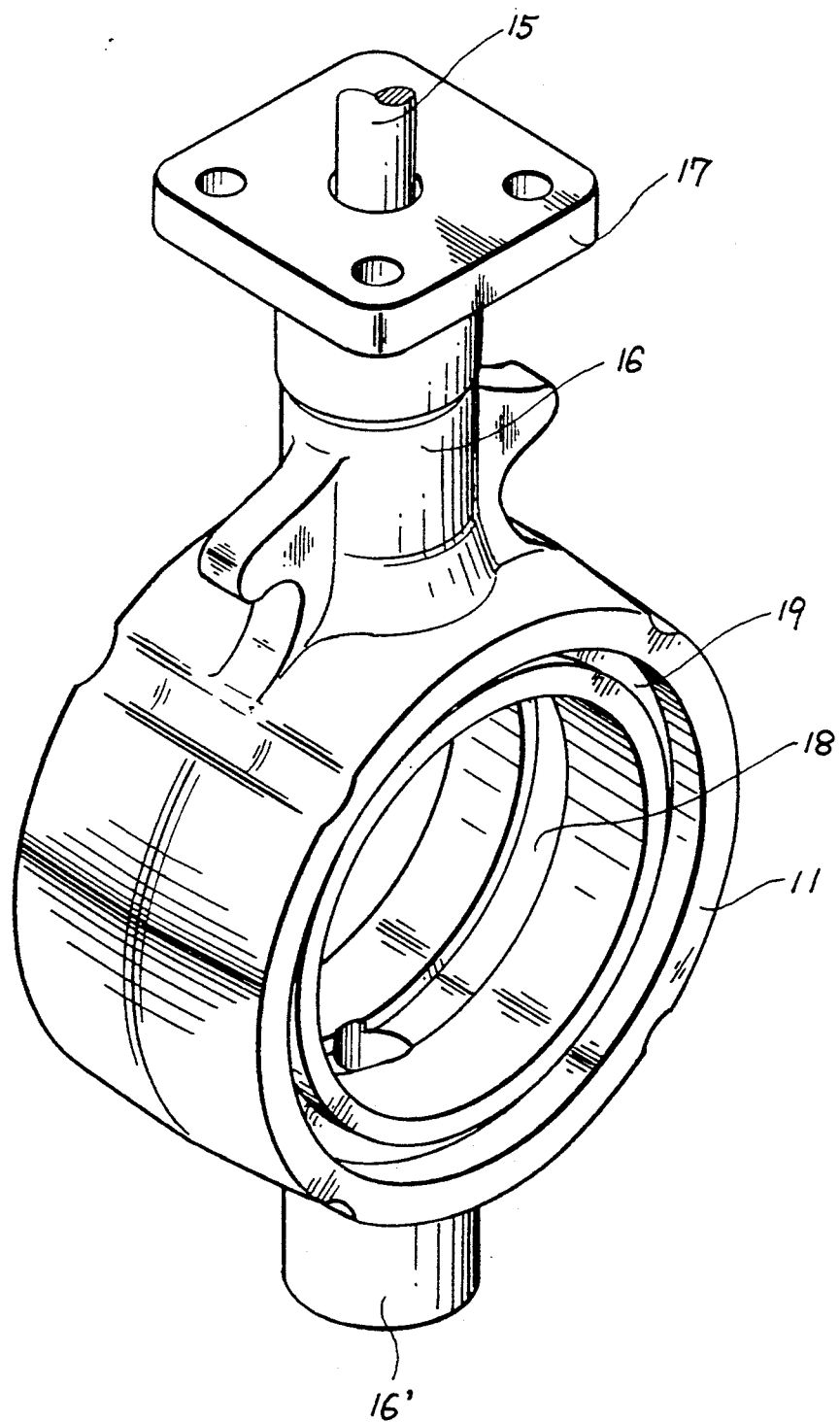
FIG. 2 is a perspective view of a valve body and a shaft cylinder.

As shown in FIG. 2, an annular concave groove (18) having a "U" shaped cross section is formed in an inner round surface of a valve body (11). An annular recess (19) is formed on the circumference direction of the flange surface.

Figure 3:
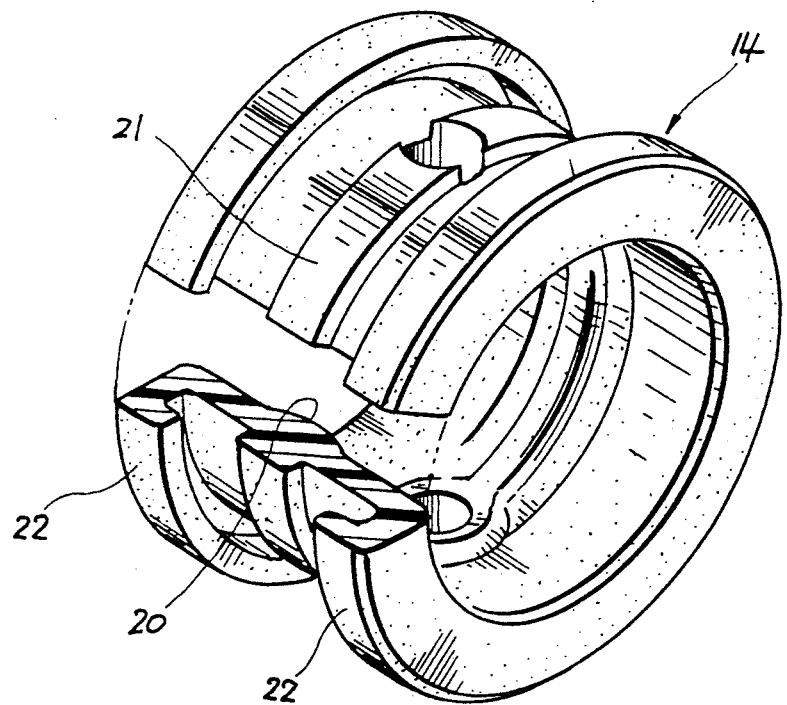
FIG. 3 is a perspective view of a seated ring.
Figure 4:
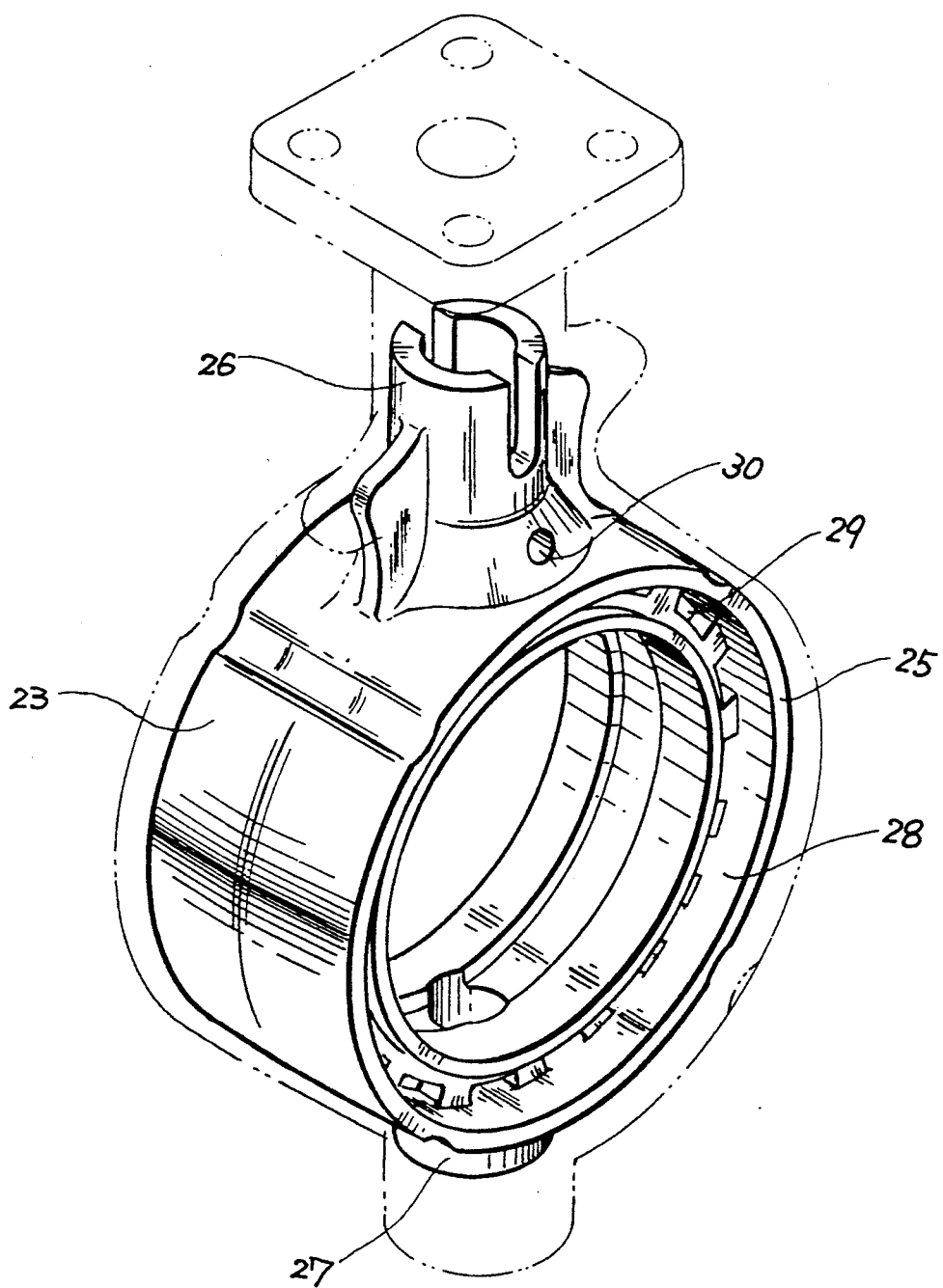
FIG. 4 is a outside appearance perspective view of a shell structure part.
Figure 5:
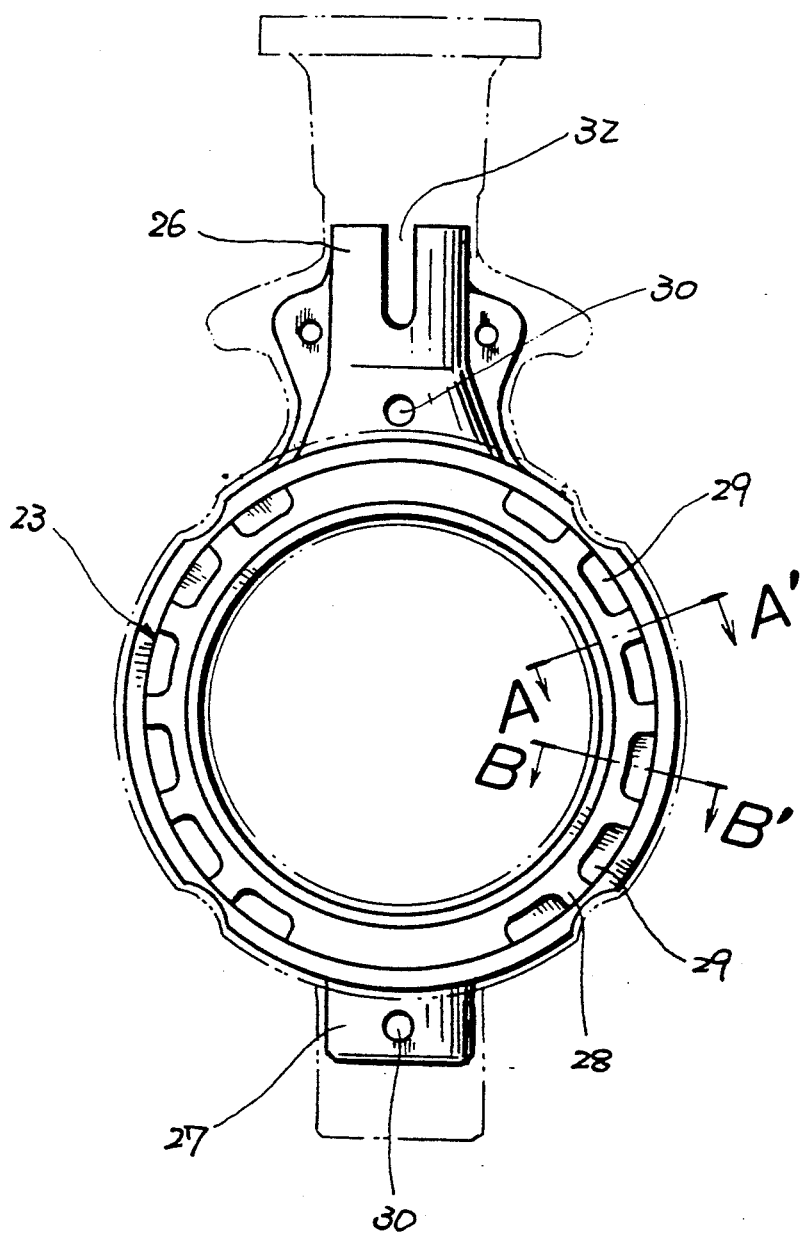
FIG. 5 is a front view of a shell structure part.
Figure 6:
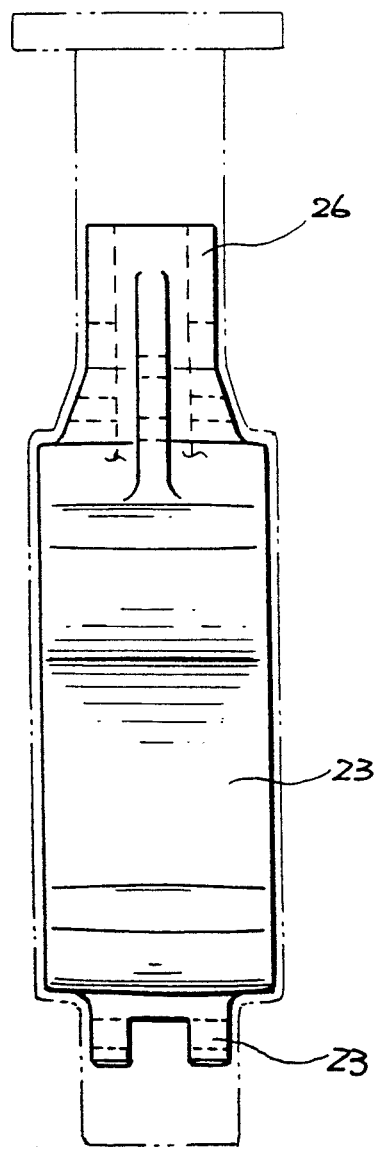
FIG. 6 is a side view of a shell structure part.
Figure 7:
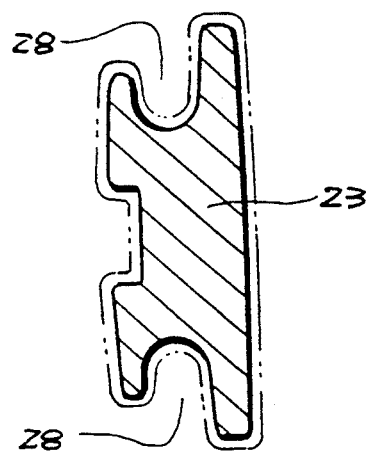
FIG. 7 is a sectional view of FIG. 5 along the line A—A'.
Figure 8:
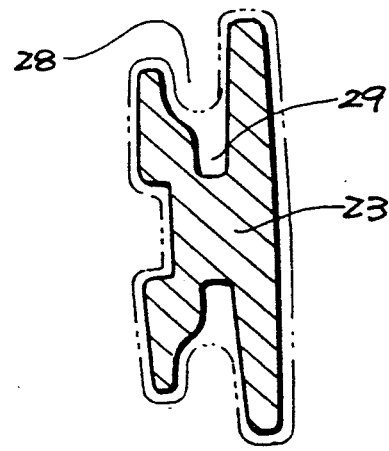
FIG. 8 is a sectional view of FIG. 5 along the line B—B'.

As shown in FIG. 3, an annular convex part (20) is formed on the inner of seated ring (14) and engages the outer edge of the valve (13) for opening and closing.

An annular convex part (21) having a rectangular sectional shape, which can be inserted into annular concave groove (18) of valve body (11), is formed on the outer of seated ring (14).

An annular transition collar (22) having an "L" shape cross section is formed along the radial direction of a seated ring (14) on the flange surface.

When seated ring (14) is set on the inner surface of the valve body (11), it prevents the seated ring (14) from moving during closing or opening of the valve (13). Insertion of the loop convex part (20) into an annular concave groove (18) and insertion of an annular recess (19) into a loop transition collar (22) hold ring (14) to body (11).

The butterfly valve of the invention is comprised of a valve body (11);

a valve body part (25) comprised of a part of shaft cylinder of a driving side (16) and a core part of shaft cylinder of an idling side (16');

an inner shell structure part (23), made of a metal material, formed of a shaft cylinder part of a driving side (26) and a shaft cylinder part of an idling side (27) in the same body; and an insulating cover (24) which covers all surfaces of said shell structure part (23) by the prescribed thickness, and forms the outside part of the shaft cylinder (16) and a setting plate (17).

In this specification, the outside part of the shaft cylinder (16) means a part of a shaft cylinder which is not covered by the insulating cover (5) which covers the outer surface of a valve body. The inside part of shaft cylinder (16) means a part of a shaft cylinder which is covered by the insulating covers (5).

The shell structure part (23) defines substantially the basic shape of a valve body (11), and includes the inside part of the shaft cylinder (16) of a driving side which is located next to the valve body (11), and provides substantial intensity of a valve body. The size of a shell structure part is formed smaller by the thickness of the insulating cover (24) which covers thereon, and provides a prescribed size by combining with the insulating cover (24).

As shown in FIG. 2 to FIG. 8, the shell structure part (23) is comprised of almost cylindrical valve body (25)

and a shaft cylinder part (26)(27) which extend outside from the opposite sides of said valve body (25).

Said shaft cylinder part (26) of a driving part has a length cut on the way of an actual shaft cylinder (16).

Each of parts (25), (26) and (27) is preferably formed in the same body by aluminum die-casting process.

The flange surface of the valve body part (25) has an annular concave groove (28) on the axial direction to form an annular groove (19) into which an annular hanging key part (22) of a seated ring (14) is inserted. A hole for decreasing thickness (29) extending in the form of slits along the axial direction of the valve body (11) and formed, having some space among those holes for decreasing thickness (29), to the direction of center part of the valve body (11) from the inside of said annual concave groove (28).

A hole for decreasing thickness (29) provides the effect of decreasing total thermal capacity of the almost cylinder valve body (25) as well as the lessening weight of the valve body (25).

A plurality of passing through holes (30) is formed through the shaft cylinder parts (26)(27). Said passing through hole (30) increases the closing property and the peeling resistance intensity of an insulating cover (24), and decreases the total thermal capacity. The number and width of space between those holes is varied in accordance with the length and thickness of the shaft cylinder parts (26)(27).

All surfaces of a shell structure part (23) are covered by an insulating cover (24) made of a synthetic resin material having insulating property such as hard polyvinylchloride and nylon, etc.

The thickness of an insulating cover (24) is selected optionally in accordance with the use condition of the butterfly valve, the thermal conductive property of a shell structure part (23) and the insulating property of an insulating cover (24). When an insulating cover (24) is made of hard polyvinylchloride, the thickness of 1 to 3 mm is preferable. The insulating cover (24) which covers the surface of a valve body part (25) is inserted into the hole (29) for decreasing thickness on the flange surface, as shown in FIG. 11, and is connected to the valve body part (25) strongly and is prevented from peeling from the valve body part (25).

Figure 12:
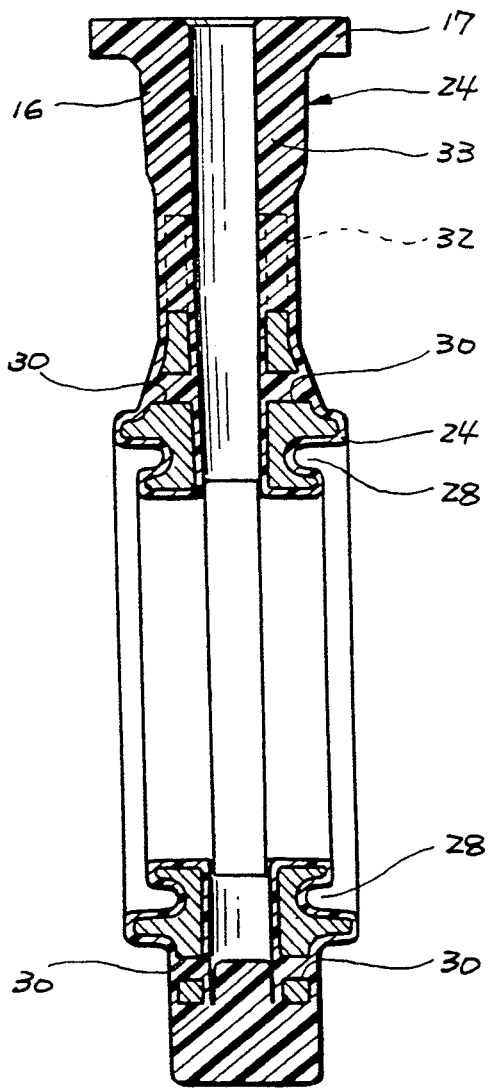
FIG. 12 is a sectional view of FIG. 10 along the line E—E'.
Figure 13:
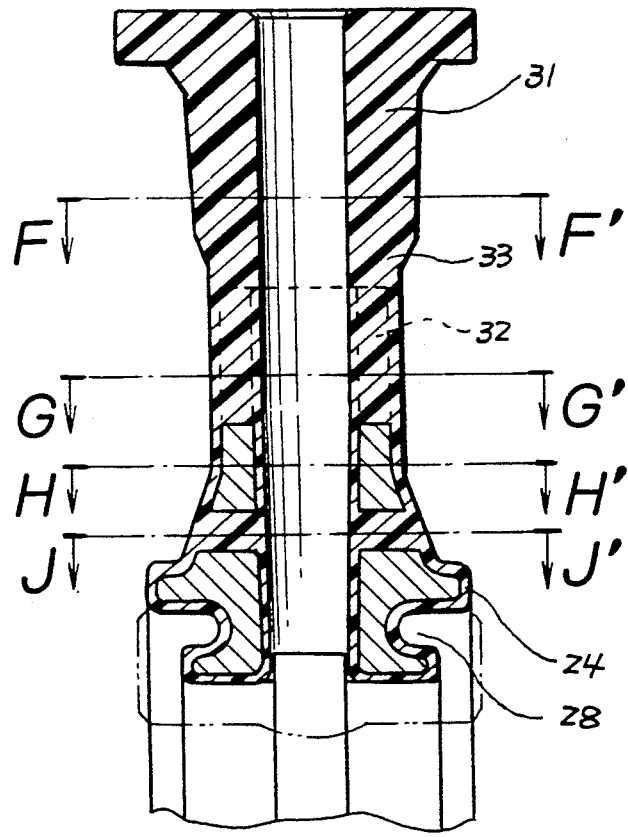
FIG. 13 is a longitudinal sectional view of a shaft cylinder of a driving part wherein a shell structure is covered by insulating cover.
Figure 17:
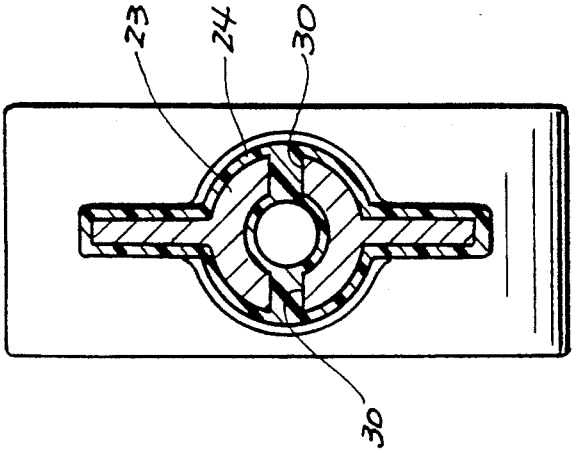
FIG. 17 is a sectional view of FIG. 16 along the line J—J'.
Figure 16:
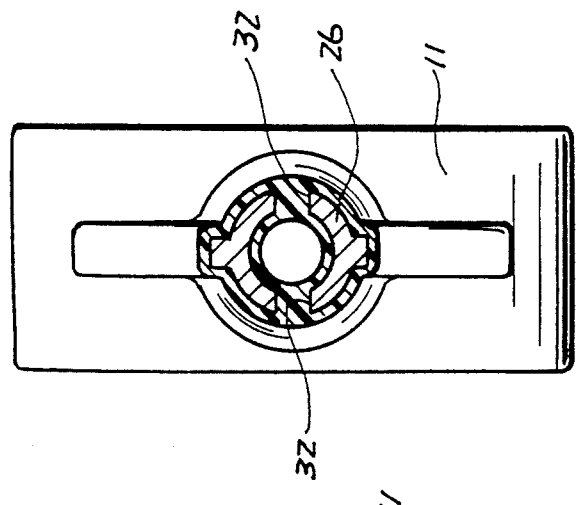
FIG. 16 is a sectional view of FIG. 13 along the line H—H'.
Figure 15:
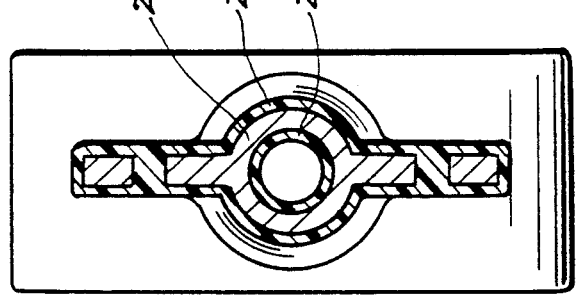
FIG. 15 is a sectional view of FIG. 13 along the line G—G'.
Figure 14:
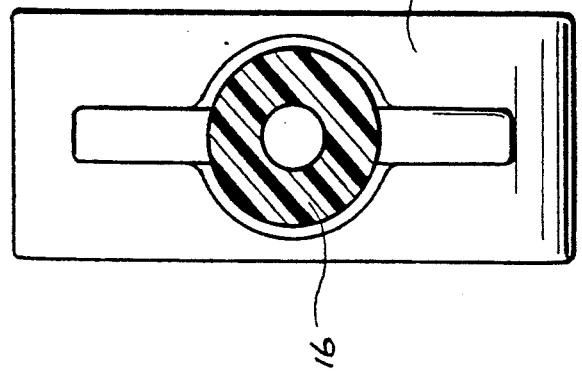
FIG. 14 is a sectional view of FIG. 13 along the line F—F'.

Also, as shown in FIG. 12 and FIG. 17, the insulating cover (24) which covers the surface of a shaft cylinder part (26)(27) can increase the connecting property to the shell structure part (23) and peeling resistance intensity because the layer which covers the inner and outer surface of shaft cylinder part (26) (27) is combined in an anchor form owing to the resin material inserted into the passing through holes (30).

The insulating cover (24) is preferably formed on the outer surface of the shell structure part (23) in the same body by injection molding process.

As mentioned above, the insulating cover (24) covers all surfaces of a shell structure part (23), and makes a substantial outer surface of valve body (11) and forms the outside part of a shaft cylinder (16) of a driving part as well as a setting plate (17).

In the shaft cylinder (16), of the driving side, the shaft cylinder part (26) of a driving side exists up to the almost half length of the shaft cylinder (16) in a form of a core. The outside part of the shaft cylinder (31) extends from that length and is made of an insulating resin material. The setting plate (17) is also made on the outer edge of the shaft cylinder (31).

In this butterfly valve, a thermal conducting breaking part (33) is made of only insulating resin material between the end edge of a shell structure part (23) and the outside part (31), at the thermal conducting breaking part (33) the temperature of controlled fluid conducted through the shell structure part (23) is insulated.

Therefore, the temperature of the controlled fluid conducted through the shell structure part (23) is insulated on the way of the shaft cylinder (26) of a driving part and the conductance of the temperature controlled fluid is insulated by the outside part (31) of the shaft cylinder (16) of a driving part and to the setting plate (17), which are part of the insulating cover (24).

Dew condensation is prevented on the outer surface of the outside part of shaft cylinder (31) and the setting plate (17) by the small difference between the atmosphere and cylinder (31) temperature.

In order to make the connection of the insulating cover (24) and the shaft cylinder part (26) of shell structure part (23) in the shaft cylinder (16) of a driving part strong and to prevent the connection from breaking by the revolving torque produced by an actuator, a cutting slit (32) is formed on the outer edge of the shaft cylinder (26) and the insulating cover (24) is inserted into said cutting slit (32), as shown in FIG. 5, FIG. 6, FIG. 12 and FIG. 15.

The strength achieved by inserting the insulating cover (24) into the cutting slit (32) is quite large. Experiments show that about ten times the twisting strength was obtained.

The length of the shaft cylinder part (26) of a driving part of the shell structure part (23) is shorter than the length of the insulating cover (5) which covers the outer surface of the valve body (11), so that the metal-made shaft cylinder part (26) of a driving part of the shell structure part (23) does not extend outside of the insulating cover (5).

Figure 18:
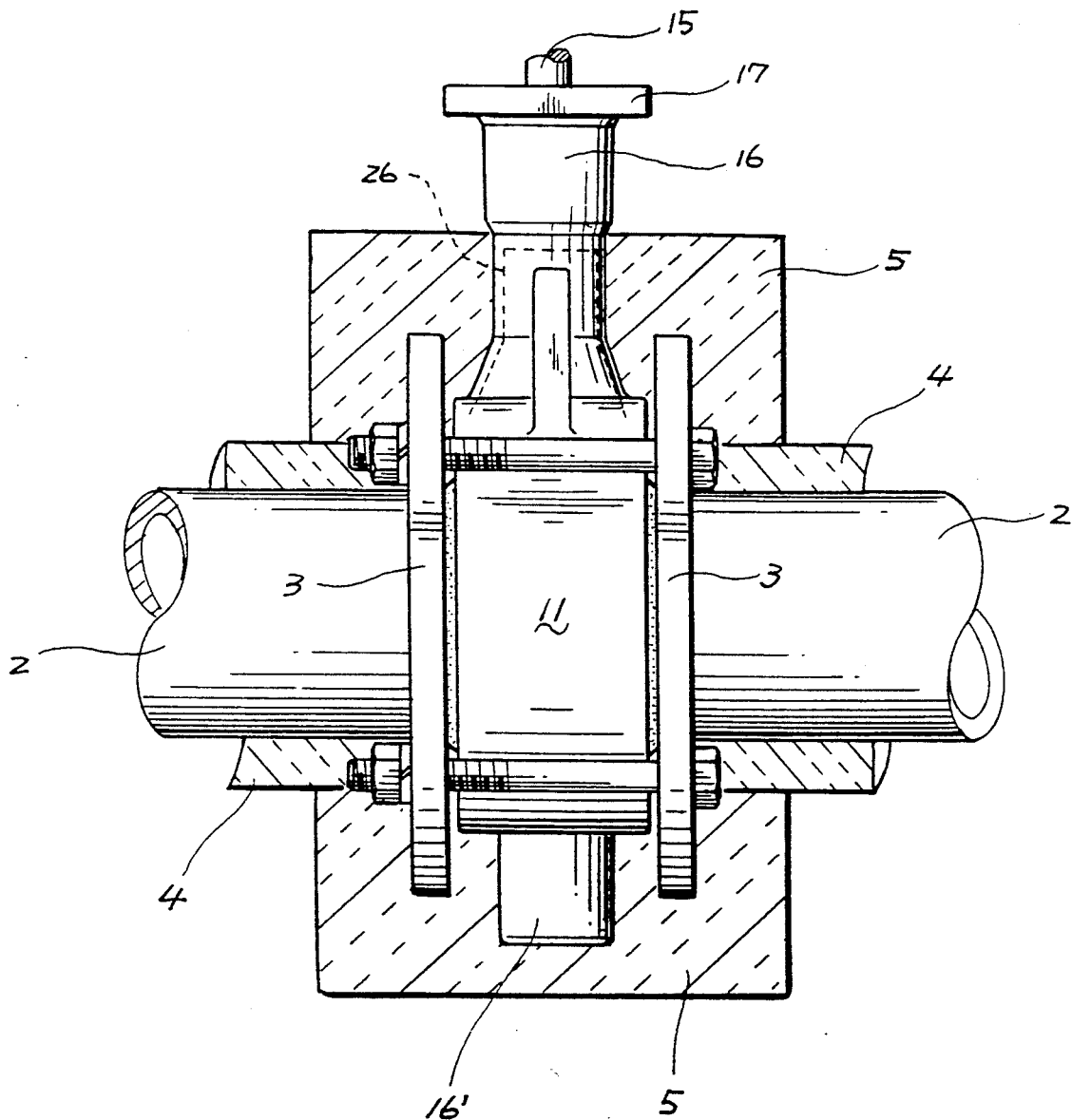
FIG. 18 is a side view showing the state that the butterfly valve of this invention sets to a piping line.

Referring to FIG. 18, the setting of the butterfly valve of this invention to the piping line will be explained.

After the valve body (11) is inserted and attached into the flanges (3)(3) of pipe (2), the outer surface of pipe (2) and the valve body (11) is covered by the insulating covers (4)(5). The outer surface of the valve body (11) as well as the inside part of the shaft cylinder of driving side (16) and the shaft cylinder of an idling side (16') are covered by the insulating cover (5).

The outside part (31) of the shaft cylinder of driving side (16) and the setting plate (17) are not covered by the insulating cover (5) and they are exposed to the atmosphere. In spite of this, the temperature of the controlled fluid does not conduct to the outside part (31) of the shaft cylinder of the driving part (16) and the setting plate (17), because the thermal conducting breaking part (33) prevents the low heat from conducting to them from the inside of the shaft cylinder in which the metal-made shell structure part (23) exists.

Therefore, the temperature difference between the atmosphere and the outer surface of the outside part (31) and the setting plate (17) is low, and no dew condensation is produced.

The prevention of dew condensation of the embodiment in the present invention was quite excellent.

Also, when the shaft cylinder of the driving side was not covered by the insulating cover (5) and was exposed to the atmosphere, the occurrence of dew condensation was observed on the outer surface of the inside part of the shaft cylinder in which the shell structure part (23)

exists. However, dew condensation did not occur on the outer surface of the outside part (31) of the shaft cylinder of driving part in which the shell structure part (23) does not exist and on the outer surface of the setting plate (17). The existence of critical line of the occurrence of dew condensation was observed. This fact also indicates the great effect of the present invention.

Now we can chose the material having not only thermal insulating property but also electrical insulating property as the material of the insulating cover (24).

By using this material, a butterfly valve having thermal insulating property as well as electrical insulating property can be provided because the structure of it is that the valve stem (15) does not contact with the metal-made shell structure part (23) directly.

Further, when the material having the chemical resistance property, the corrosion resistance property and the friction resistance property is used as the material of the insulating cover (24), a butterfly valve can be provided having each property.

An increase of sturdiness of the shaft cylinder is obtained by putting a metal plate for supporting the outside part (31) of the shaft cylinder and the setting plate (17). However, this supporting metal cylinder must not extend inwardly over the thermal conducting breaking part (33).

In the embodiments mentioned above, we explained the butterfly valve wherein the outer surface of the metal-made shell structure part (23) is covered by the insulating cover (24). However, the present invention is not limited to only this embodiment.

Figure 19:
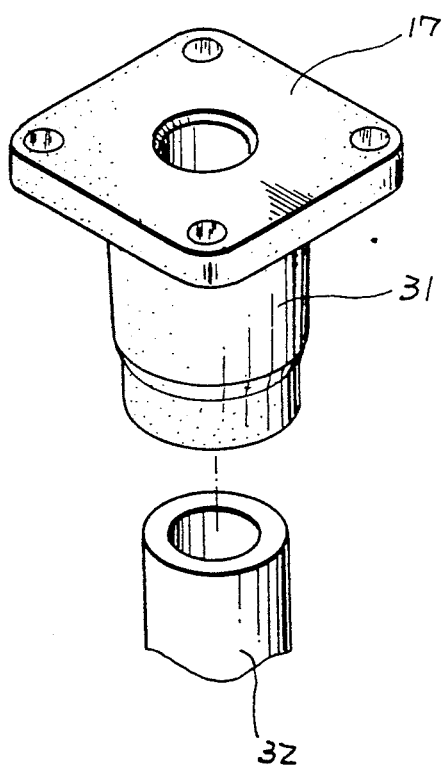
Figure 20:
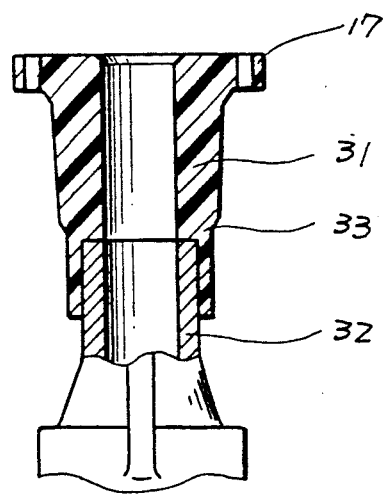

It is possible to finish the shaft cylinder of driving part (16) in the inside part covered by the insulating cover (5) and to make the outside part (31) of the shaft cylinder, the setting plate (17), which cannot be covered by the insulating cover (5), and the thermal conducting breaking part (33) separately in the different body, and connect these parts to the part of the valve body made of metal. FIG. 19 to FIG. 20 show these modified embodiments having these structures.

In FIG. 19 and FIG. 20, the metal-made valve body and the inside part of the shaft cylinder of driving parts have enough length to be covered by the insulating cover (5), the outside part of the shaft cylinder (31), the setting plate (17) and the thermal conducting breaking part (33) are formed in the different body from the valve body and the inside part of the shaft cylinder by using only insulating resin material. The top edge part of these separated parts is inserted and connected strongly to the top edge part of the inside part of the shaft cylinder.

Those two parts are connected unrotatably sufficiently, preferably, this part is made in one body by an injection molding process to inject resins to the top edge of the inside part of the shaft cylinder.

The inserting depth between the inside part and the outside part is preferably at least the same length as the diameter of the shaft or longer than this.

FIG. 21 and FIG. 22 show the structure of connection of this part wherein the inside part (32) of the shaft cylinder adheres to the outside part (33) of it on both surface edges by adhesive agents. The terminal conducting breaking part (33) exists between the inside part (32) and the outside part (33). The most preferable adhesive agent is the instant adhesives having cyanoacrylate in the main component. However, any other adhesive agents also are available.

Also, to this connection we can use not only adhesive agents but also the connection by vibration melting adhesion between metal and resin.

Figure 23:
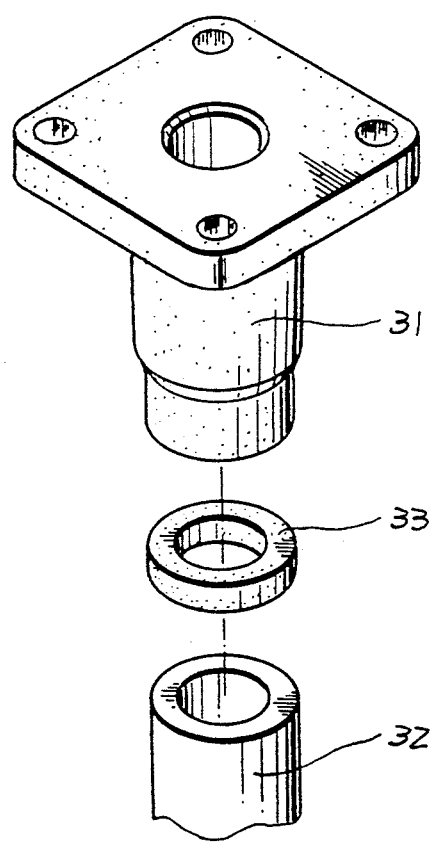
Figure 24:
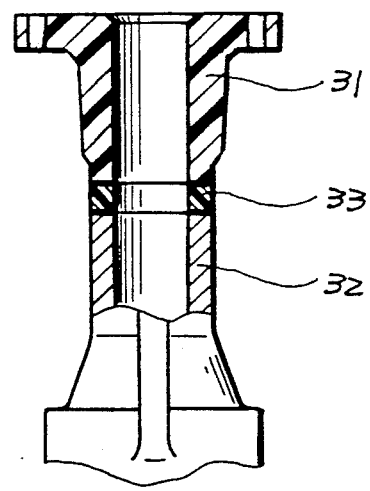

FIG. 23 and FIG. 24 show the other connection existence means between the outside part (31) and the inside part (32), for example a ring-shape connection existence (33) made of ceramic material is used for the connection means between the outside part (31) and the inside part (32).

Among ceramic materials, for example, alumina ($Al_2O_3$) or silica ($SiO_2$) can provide an excellent connection to both sides of the metal and resin. A strong connection was obtained using the ring-shape connection made of ceramic material between the outside part (31) and the inside part (32).

This ceramic ring also provides the thermal conducting breaking part (33) between the outside part (31) and the inside part (32).

Figure 25:
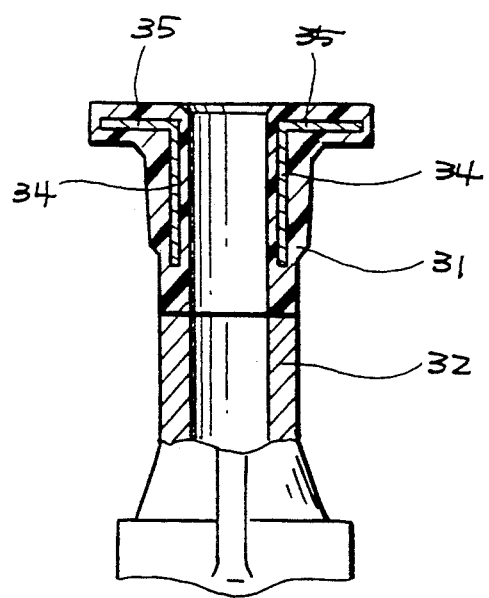
FIG. 25 is a sectional view of a further modified embodiment.
Figure 26:
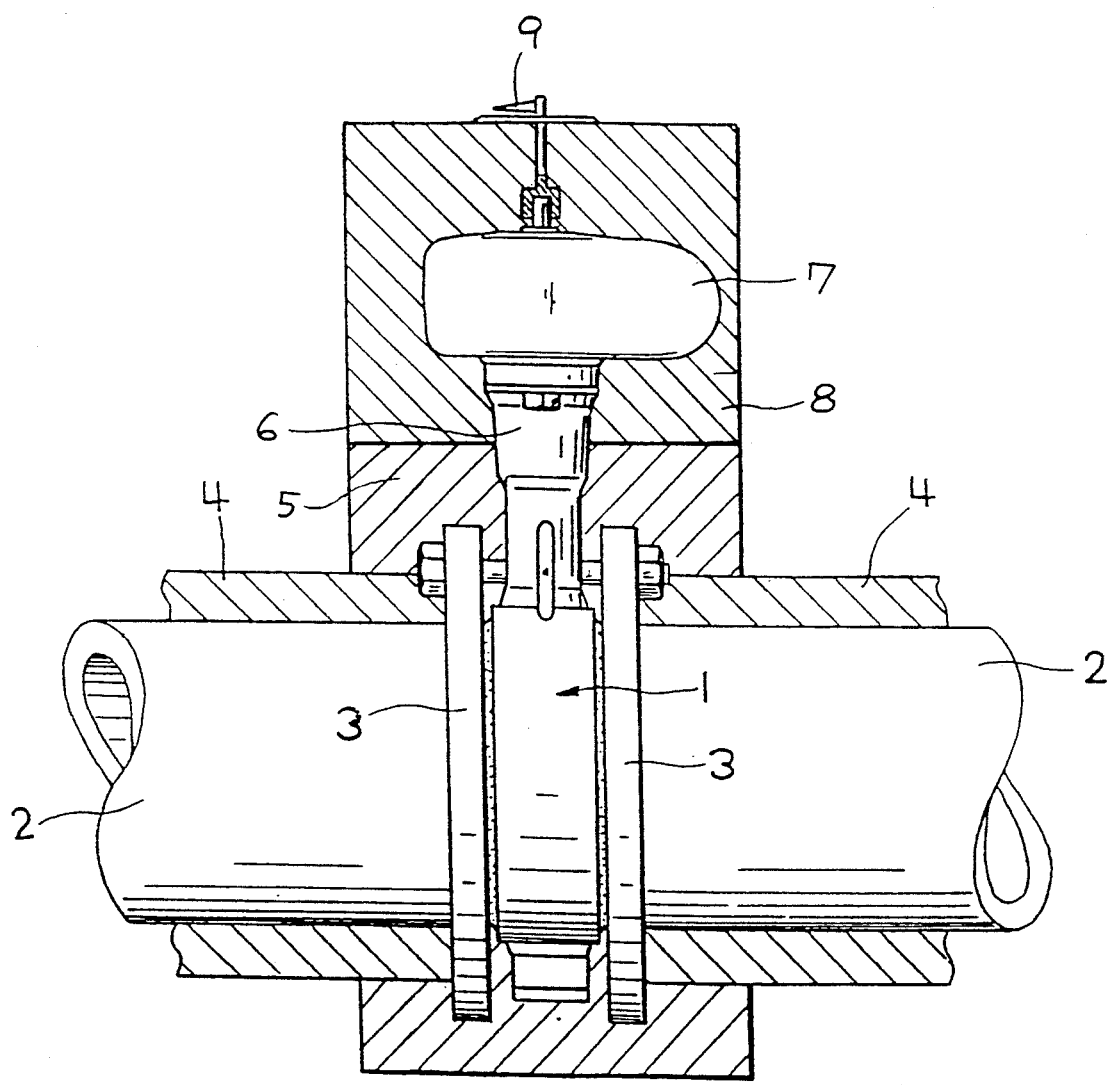
FIG. 26 is a sectional view of a prior butterfly valve showing an insulating means by prior insulating cover.

FIG. 25 still further shows another embodiment of the invention which increases the sturdiness of the separated part, namely the outside part (31) and the setting plate (17) by putting the metal supporting cylinder (34) and the metal supporting board (35) into the material of the outside part (31) and the setting plate (17). In this case, the metal supporting cylinder (34) cannot extend out of the thermal conducting breaking part (33).

The temperature conduction of controlled fluid is stopped at the insulating cover and is prevented from conducting to the outside part of the shaft cylinder over the insulating cover because there is the thermal conducting breaking part between the inside part of the shaft cylinder covered by the insulating cover and the outside part of it which is not covered by the insulating cover.

As a result of this, the outside part of the shaft cylinder which is exposed from the insulating cover has the same temperature as the atmosphere and dew condensation of the temperature difference does not occur. Also because all surfaces of the shell structure part made of metal material are covered by the insulating material made of insulating resin material, this butterfly valve of the invention has sufficient mechanical sturdiness.

The adhesive property and peeling resistance property of the insulating cover (24) is increased because the insulating cover (24) can be inserted into the hole for decreasing thickness (29) of the valve body part (25) and into the passing through hole (30) of the shaft cylinder part (26)(27).

According to this invention, special insulating work for the valve is unnecessary in connecting the valve to the pipe. Use of a valve becomes much easier because no dew condensation occurs on the outer surface of the outside of the shaft cylinder because the thermal conducting breaking part between the outside part of the shaft cylinder of driving part and the inside part prevents the temperature of controlled fluid from conducting to the outside part of the shaft cylinder at the thermal conducting breaking part.

Also, this invention provides a butterfly valve having excellent mechanical sturdiness property and sufficient durability property because the insulating cover is inserted into the hole for decreasing thickness and the hole passing through the shell structure part.

And these holes can decrease the thermal capacity of the shell structure part and this effect can provide sufficient dew condensation prevention effect.

Still further, by selecting the material for insulating the cover optionally, a butterfly valve having electrical insulating property can be provided in this invention.

What is claimed is:

1. A butterfly valve for preventing dew condensation which comprises:
   a valve body having a cylindrical flow passage therein;
   a disk-like valve located rotatably in said valve body;
   a seated ring formed with a sealing material, inserted between an inner surface of said valve body and an outer surface of said disk-like valve, and connected to said outer surface of said disk-like valve;
   a pair of valve stems comprising a driving side and an idling side, which sides extend radially and in the opposite direction;
   a pair of shaft cylinders for the driving side and the idling side which extend outside of said valve body and in opposite radial directions from said valve body;
   an insulating cover applied on the external surface of said valve body and applied around said shaft cylinder for prevention of dew condensation;
   a thermal conducting breaking part set on a part of said shaft cylinder of driving side; and
   said thermal conducting breaking part being located on the outside of said insulating cover.

2. A butterfly valve according to claim 1, wherein said thermal conducting breaking part is made of thermal insulating resin material.

3. A butterfly valve according to claim 1, wherein an outside part of the shaft cylinder of driving side above the insulating cover which is exposed to the atmosphere, and said thermal conducting breaking part are made of insulating resin material.

4. A butterfly valve according to claim 1, wherein the thermal conducting breaking part and an outside part of driving cylinder are made of insulating resin material and are formed in the same body as the insulating cover.

5. A butterfly valve according to claim 1, wherein the thermal conducting breaking part and the outside part of driving cylinder are made of insulating resin material; are formed separately in a different body from the insulating cover of the valve body; and are connected to the outside edge of an inside part of the shaft cylinder of the driving side.

6. A butterfly valve according to claim 5, wherein the outside part of the shaft cylinder for the driving side, including the thermal conducting breaking part, is connected to an inside part of the shaft cylinder for the driving side by adhesive means.

7. A butterfly valve according to claim 5, wherein the outside part of the shaft cylinder for the driving side, including its thermal conducting breaking part, is connected to the inside part of the shaft cylinder of the driving part by melting means.

8. A butterfly valve according to claim 5, wherein the outside part of the shaft cylinder for the driving side, including its thermal conducting breaking part, is connected to the inside part of the shaft cylinder of the driving part by way of a ring-like existence inserting a ring-like existence between the outside part of it and the inside part of it.

9. A butterfly valve according to claim 1, wherein said insulating resin material is hard polyvinylchloride.

10. A butterfly valve according to claim 1, wherein said insulating resin material is nylon.

11. A butterfly valve according to claim 1, wherein said insulating material is an electrical insulator.

12. A butterfly valve according to claim 1, further including a metal-made supporting cylinder on the outside part of the shaft cylinder of the driving side made of insulating resin material and wherein said metal-made supporting cylinder does not extend over the thermal conducting breaking part.

13. A butterfly valve according to claim 1, wherein a setting plate for an actuator is located on an outer edge of the shaft cylinder for the driving side.

14. A butterfly valve for preventing dew condensation which comprises:
   a shell structure part made of metal material; and
   an insulating covering part which covers all surfaces of said shell structure part, said shell structure part having an almost cylindrical valve body forming flow passage, a shaft cylinder part which extends radially outside in opposite directions, and a setting plate portion on the outer edge of the shaft cylinder of a driving side;
   wherein said shell structure part is formed smaller than the prescribed size of the butterfly valve by an amount equal to the thickness of insulating covering part;
   wherein said insulating covering part is made of synthetic resin material having insulating property, fitting closely to all surfaces of said shell structure part as to form one body;
   wherein the shaft cylinder of the driving side is applied to the outer surface of the valve body;
   wherein said shell structure part ends at the covering part of the insulating cover which covers the shaft cylinder of the driving side;
   wherein the outside part of the shaft cylinder of the driving side is formed by insulating synthetic resin material of the insulating cover; and
   wherein a thermal conducting breaking part is made of only insulating synthetic resin material formed between the outside part of the shaft cylinder of the driving side and said end of a shell structure part.

15. A butterfly valve according to claim 14, wherein the shaft cylinder part of the driving side in the shell structure has a cutting slit on the outer edge thereof and the resin material is inserted into said cutting slit, whereby the connection between the inside part of the shaft cylinder of the driving side and the outside part of the shaft cylinder of the driving side is made.

16. A butterfly valve according to claim 14, wherein a plurality of holes for decreasing thickness is formed inwardly from the flange surface of the shell structure part and the insulating covering part is inserted into said holes.

17. A butterfly valve according to claim 14, wherein a plurality of passing through holes is formed in the shaft cylinder part of the shell structure part and the insulating cover part which covers the outer and inner side of said shaft cylinder is connected by the resin inserted into those passing through holes.

18. A butterfly valve according to claim 14, wherein the synthetic resin material which forms the insulating cover part is an electrical insulator.

19. A butterfly valve according to claim 14, wherein the metal-made supporting cylinder is put into the outside of a shaft cylinder located on the outer edge of the thermal conducting breaking part, and said metal-made supporting cylinder does not extend over the thermal conducting breaking part.

20. A butterfly valve according to claim 14, wherein a setting plate for an actuator is mounted on an outer edge of said shaft cylinder of a driving side.

* * * * *